United States Patent [19]

Uffner

[11] 4,048,086

[45] Sept. 13, 1977

[54] COBALTIC ACCELERATORS WITH GROUP II METAL OXIDES AND HYDROXIDES

[75] Inventor: Melville W. Uffner, Glen Mills, Pa.

[73] Assignee: Air Products and Chemicals, Inc., Allentown, Pa.

[21] Appl. No.: 583,500

[22] Filed: June 3, 1975

[51] Int. Cl.$^2$ .............................................. C08G 63/12
[52] U.S. Cl. ............................... 252/182; 260/75 NB; 260/75 UA; 260/863; 423/138
[58] Field of Search ........................ 252/182; 423/138; 260/439 R, 75 NB, 75 UA, 863

[56] References Cited

U.S. PATENT DOCUMENTS

| | | | |
|---|---|---|---|
| 2,897,181 | 7/1959 | Windemuth | 260/75 NB |
| 3,449,276 | 10/1969 | Rabenold | 260/863 |
| 3,584,076 | 6/1971 | Chetakian | 260/863 |

OTHER PUBLICATIONS

27th Annual Technical Conference, The Soc. of the Plastic Industries, sec. 12-D, pp. 1-10.

*Primary Examiner*—Brooks H. Hunt
*Assistant Examiner*—Irwin Gluck
*Attorney, Agent, or Firm*—Russell L. Brewer; Barry Moyerman

[57] ABSTRACT

This invention relates to an accelerator composition particularly adapted for providing extended shelf life to sheet and bulk molding compound while providing for accelerated cure rates at molding temperatures. The accelerator composition comprises in combination:

a cobaltic promotor selected from the group consisting of cobaltic halides, cobaltic salts of monocarboxylic acids having from 2 to 20 carbon atoms, cobaltic sulfate, and cobaltic beta-diketones; and from about 1 to 4,500 parts, per part of cobaltic metal in said cobaltic promoter, of a coupler selected from the group consisting of oxides and hydroxides of calcium and magnesium.

7 Claims, No Drawings

4,048,086

COBALTIC ACCELERATORS WITH GROUP II METAL OXIDES AND HYDROXIDES

BACKGROUND OF THE INVENTION

Calcium and magnesium oxide and hydroxide couplers have been used in the preparation of sheet and bulk molding compound (SMC and BMC) in order to give compounders and molders of unsaturated polyester resin wide latitude in the molding of products. They permitted compounders and formulators to form a resin in bulk which was tack free and could be easily handled for forming a final product. The use of couplers also permitted the formation of reinforced resin compositions which essentially eliminated resin rich molding. Resin rich molding occurred with non-thickened compounds in that the polyester resin and vinyl monomer separated from the reinforcing medium e.g., chopped fiberglass.

A number of organometallic promotors and catalysts have been used for promoting the cure of polyesters. Although they were effective for enhancing the cure rate of neat polyester resins, they were suited for the preparation of sheet and bulk molding compound because they were too active at temperatures below the molding temperature and caused gelation prior to molding. Those that were acceptable in terms of shelf life were found to be ineffective for accelerating the cure at molding temperatures.

DESCRIPTION OF THE PRIOR ART

A number of patents report the use of organo-metallics in promoting the cure rate of unsaturated polyester resins and these organo-metallics include soluble salts of reactive metals such as manganese octanoate, cobalt naphthenate, cobalt decanoate, lithium octanoate, lithium thiocyanate, aluminum laurate, aluminum octoate, and gallium octoate. These salts, however, are too reactive and result in SMC and BMC having a short shelf life. Gelation generally occurs within a matter of a few days at storage temperatures of 75° F. Under accelerated conditions e.g., 100° F gelation occurs much more rapidly.

Generally high temperature peroxyester, peroxide, and hydroperoxide free-radical initiating catalysts have been used for catalyzing the cure of sheet and bulk moding compound. The high temperature peroxide and hydroperoxide catalysts provide for adequate shelf life at temperatures of from about 75° to 100 ° F and yet provide sufficient reactivity at the molding temperature to provide desirable cure rates.

SUMMARY OF THE INVENTION

It has been found that the accelerator compositions of this invention are effective for extending the shelf life of a molding compound comprising an unsaturated polyester resin and an unsaturated monomer, soluble and copolymerizable therewith at temperatures below the molding temperature and yet provide sufficient reactivity at the molding temperature for enhanced cure rates. Additionally, when the accelarator composition is combined with the molding compound comprising unsaturated polyester resin and unsatured monomer chemical thickening is effected to permit formation of sheet and bulk molding compound as in the past. The accelerator composition of this invention comprises a cobaltic promotor selected from the group consisting of cobaltic halides, cobaltic salts of monocarboxylic acids having from 2 to 20 carbon atoms, cobaltic sulfate, and cobaltic beta-diketones; and from about 1 to 4,500 parts, per part of cpbaltic metal in said cobaltic promoter, of a coupler selected from the group consisting of oxides and hydroxides of calcium and magnesium.

Advantages of the accelerator composition of this invention include:

the ability to form sheet and bulk molding compound having extended shelf life, even under accelerated test conditions of 100° F, as compared to sheet and bulk molding compound prepared by prior art techniques;

the ability to form sheet and bulk molding compound which has a kick off temperature sufficiently high e.g., from about 200° to 250° F so that gelation will be minimized when the resin is placed in the mold; and the ability to produce molding compounds which are not adversely discolored by the accelerator composition.

DESCRIPTION OF THE PREFERRED EMBODIMENTS

The cobaltic promoters suited for forming the accelerator composition of this invention are the cobaltic promoters where the cobaltic ion is present in its valence 3 state. Examples of cobaltic promoters suited for practicing this invention are the cobaltic salts of monocarboxylic acids having from 2 to 20 carbon atoms (sometimes referred to as cobaltic soap) e.g., cobaltic acetate, cobaltic decanoate, cobaltic neodecanoate, cobaltic octanoate, and cobaltic naphthenate; cobaltic salts of beta-diketones e.g., cobaltic acetyl acetonate, and cobaltic acetonyl acetonate; and dispersible inorganic cobaltic salts such as cobaltic halides e.g., cobaltic fluoride, cobaltic chloride; and cobaltic sulfate. The preferred cobaltic promoters for forming the accelerator composition are those inorganic promoters and preferably the organo promoters which are highly soluble in a polyester resin syrup. Cobaltic promoters which are soluble in the polyester resin syrup permit uniform dispersion throughout the molding compound and reduce the possibility for localized cold spots or localized areas which may pre-gel prior to molding.

The coupler component of the accelerator composition is better known for its chemical thickening nature in preparing sheet and bulk molding compound from polyester resins and includes the oxides and hydroxide of calcium and magnesium. Of these magnesium oxide and hydroxide are preferred and in the most preferred embodiment magnesium oxide.

The coupler comprising the oxide or hydroxide of calcium and magnesium is added to the accelerator composition in a proportion of from about 1 to about 4,500 parts by weight per part of cobaltic metal present in the cobaltic promoter. Preferably this proportion is from about 30 to 600 parts and more preferably from about 50 to 400 parts coupler per part cobaltic metal. When the proportion of coupler falls below about 10 parts per part of cobaltic metal in the promoter then the accelerator composition does not provide adequate coupling or thickening when incorporated into a polyester resin syrup comprising unsaturated polyester resin and vinyl monomer. On the other hand, when the proportion of coupler exceeds about 4,500 parts coupler per part cobaltic metal, the coupler is present in a proportion greater than required for desirable thickening. More importantly, though there generally isn't sufficient cobaltic promotor for enhancing the cure rate of the molding compound at the molding temperature or for enhancing the shelf life of the modling compound. As the ratio of coupler to cobaltic metal is adjusted to 30 parts to 600 parts coupler per part cobaltic promoter and more preferably to 50 to 400 parts per part cobaltic metal, greater efficiency of product and economy is achieved.

The proportions of coupler when combined with the cobaltic promoter in the proportion set forth provide for desirable additions of cobaltic metal to the molding compound in a proportion of from about 0.006 to 0.036 parts per 100 parts resin and from about 0.5 to 25 parts coupler per 100 parts resin. In the preferred ranges the proportion of cobaltic metal and coupler that would be incorporated into the molding compound is from about 0.0075 to 0.03 parts cobaltic metal per 100 parts resin and from about 0.5 to 5 parts coupler per 100 parts resin.

Apparently there is a synergistic reaction between the coupler e.g., the oxide and hydroxide of calcium and magnesium and the cobaltic promoter which is not present in either. It simply isn't the combined result of adding a coupler and a promoter to a molding compound for its intended effect. For example, when the cobaltic promoter is incorporated into the initiated molding compound, in the absence of the coupler, the shelf life is reduced as compared to when the promoter and coupler are combined. Likewise, when the coupler is employed to the exclusion of the cobaltic promoter the shelf life is reduced and naturally without an accelerator the cure rate is substantially diminished. Apparently the coupler tends to deactivate the cobaltic promoter at temperatures below the molding temperature e.g., room temperature to about 100° F and yet activates or releases the cobaltic promoter from its deactivated state at the molding temperature or slightly lower to provide desired peak exotherm temperatures and accelerated cure rates for polyester resins.

The accelerator composition are adapted for enhancing the shelf life of molding compounds comprising conventional unsaturated polyester resins derived by reacting an alpha-beta unsaturated dicarboxylic acid with a polyhydric alcohol e.g., propylene glycol or glycerol and unsaturated monomer. Any of the conventionally used polyester resin compositions can be used for practicing this invention including the unsaturated monomer components normally used for effecting cross-linking of the polyester component.

The accelerator composition can be added together or separately in forming a molding compound so long as it is blended substantially uniformly. For example, the accelerator composition can be formulated prior to manufacturing the molding compound, and then added to the compound or each component can be added separately. Sometimes it is preferred to disperse the accelerator composition in a carrier and add this dispersion to the molding compound.

Various components can be added in the manufacture of molding compounds without departing from the beneficial effects of the accelerator compositions described herein. For example, drying oils, fillers, lubricants, reinforcing agents, low shrink components and pigments typically used in the preparation of molding compositions can be used in practicing this invention.

The following examples are provided to illustrate preferred embodiments of this invention and are not intended to restrict the scope thereof. All parts are parts by weight and all percentages are pressed as weight percentages.

EXAMPLE I

An accelerator composition was prepared by mixing 0.072 parts of cobaltic acetyl acetonate and 2.5 parts $Mg(OH)_2$.

The effectiveness of this promoter was determined by incorporating it into 100 parts conventional polyester resin and determining the resulting shelf life. The polyester resin contained 60 parts of Paraplex P-340 which is the reaction product of a mixture of fumaric and maleic acid and a mixture of propylene and ethylene glycol in styrene. The unsaturated polyester resin component is present at a proportion of from about 65 to 70 parts and the styrene component is present in a proportion of from about 35 to 30 parts. Then 40 parts of an additional resinous component i.e., Paraplex P-701, which is a low shrink component comprising a thermoplastic acrylate in styrene, was added to the Paraplex P-340. The molding compound was preparated by adding 5 parts zinc stearate, 150 parts calcium carbonate, and 2.572 parts of the accelerator composition to the 100 parts resin. This level of addition of acceleration composition provided 2.5 parts magnesium hydroxide and 0.012 parts cobaltic metal. Then 1 part of t-butylperbenzoate was added as an initiator.

The resulting sheet molding paste was evaluated for shelf life under accelerated conditions which involved storing a 300 gram charge of the paste in capped cans at 100° F after compounding. The contents of the can were checked daily for penetrability by a screw driver. When the tip of the screw driver blade could no longer be pushed to the bottom, the paste was considered no longer moldable and its shelf life was considered terminated.

The cobaltic promoted polyester resin with this accelerator composition had a shelf life of from 18 to 20 days and when reinforced with 105 parts fiberglass had a cure time of 1.25 minutes at 300° F.

EXAMPLE II

Example I was repeated except that 1.25 parts magnesium oxide was employed in place of the 2.5 parts magnesium hydroxide. Then 1.322 parts accelerator composition were added to the polyester resin, providing 0.012 parts cobaltic metal and 1.25 parts magnesium oxide per 100 parts polyester resin.

The resulting sheet molding compound paste when evaluated under the same conditions as the composition of Example I had a shelf life of 26 days. This clearly shows that there is a substantial improvement of the polyester resin component having the accelerator composition comprising a cobaltic promoter and magnesium oxide as opposed to a cobaltic promoter and magnesium hydroxide.

EXAMPLE III

Example I was repeated except that 0.0485 parts Co $Cl_2.6H_2O$ and 2.5 parts magnesium hydroxide were added to the polyester resin component described in Example I. The proportion of cobaltous metal and magnesium hydroxide per 100 parts resin remained the same.

The resulting paste was evaluated for shelf life under the same condition as set forth in Examples I and II and a shelf life of from 1 to 2 days was recorded. A cure time of 1.75 minutes also was noted.

EXAMPLE IV

Example I was repeated except that cobaltous naphthenate was substituted for the cobaltic acetyl acetonate in the accelerator composition in sufficient proportion to provide 0.012 parts cobaltous metal per 100 parts resin.

The resulting paste was evaluated for shelf life and a value of 1 to 2 days was recorded.

EXAMPLE V

Example I was repeated except that cobaltous acetyl acetonate was substituted for the cobaltic acetyl acetonate in sufficient proportions to provide 0.012 parts cobaltous metal per 100 parts resin.

The resulting paste was evaluated for shelf life and a value of 2 to 3 days was recorded.

The results obtained in Examples I and II clearly show that polyester resins employing an accelerated composition comprising a cobaltic promoter and a magnesium hydroxide and a cobaltic promotor and magnesium oxide have an extended shelf life over accelerator compositions comprising a cobaltous promoter such as cobaltous chloride, cobaltous naphthenate and cobaltous acetyl acetonate in combination with the same thickener as shown in Examples III, IV and V. The tests also show that the cobaltic promoter in combination with magnesium oxide gives enhanced shelf life of a sheet molding compound paste over a similarly prepared paste employing magnesium hydroxide as the promoter.

What is claimed is:

1. An accelerator composition suited for providing extended shelf life to sheet and bulk molding compound while providing accelerated cure rates at molding temperatures which comprises in combination:
    a cobaltic promotor selected from the group consisting of cabaltic halides, cobaltic salts of monocarboxylic acids having from two to 20 carbon atoms, cobaltic sulfate, and cobaltic beta-diketones; and
    from about 1 to 4,500 parts, per part of cobaltic metal in said cobaltic promotor, of a coupler containing either calcium or magnesium.

2. The accelerator composition of claim 1 wherein said coupler is present in a proportion of from about 30 to 600 parts per part of cobaltic metal in said cobaltic promotor.

3. The accelerator composition of claim 2 wherein said cobaltic promotor is a cobaltic beta-diketone.

4. The accelerator composition of claim 3 wherein said coupler is selected from the group consisting of oxides and hydroxides of magnesium.

5. The accelerator composition of claim 4 wherein said cobaltic beta-diketone is cobaltic acetyl acetonate.

6. The accelerator composition of claim 5 wherein said oxide and hydroxide of magnesium is present in a proportion of from about 50 to 400 parts per part of cobaltic metal.

7. The accelerator composition of claim 6 wherein said coupler is magnesium oxide.

* * * * *